United States Patent
Nahill et al.

(10) Patent No.: US 10,043,042 B2
(45) Date of Patent: *Aug. 7, 2018

(54) DECODABLE INDICIA READING TERMINAL WITH INDICIA ANALYSIS FUNCTIONALITY

(71) Applicant: METROLOGIC INSTRUMENTS, INC., Blackwood, NJ (US)

(72) Inventors: James Nahill, Turnersville, NJ (US); Mark Hernadez, Mount Laurel, NJ (US); Sergio DiVentura, Blackwood, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/430,573

(22) Filed: Feb. 13, 2017

(65) Prior Publication Data

US 2017/0154195 A1    Jun. 1, 2017

Related U.S. Application Data

(63) Continuation of application No. 15/007,293, filed on Jan. 27, 2016, now Pat. No. 9,576,158, which is a continuation of application No. 14/160,645, filed on Jan. 22, 2014, now Pat. No. 9,251,387, which is a continuation of application No. 13/217,104, filed on Aug. 24, 2011, now Pat. No. 8,636,212.

(51) Int. Cl.
*G06K 5/00* (2006.01)
*G06K 7/10* (2006.01)

(52) U.S. Cl.
CPC ........... *G06K 5/00* (2013.01); *G06K 7/10554* (2013.01); *G06K 7/10722* (2013.01)

(58) Field of Classification Search
CPC ........... G06K 7/10851; G06K 7/10722; G06K 7/10554; G06K 5/00; B41F 33/0036
USPC .......... 235/375, 435, 454, 455, 437, 462.01, 235/462.06, 462.11
See application file for complete search history.

(56) References Cited

U.S. PATENT DOCUMENTS 5,218,190 A * 6/1993 Hardesty .................. G06K 5/00
                                                                235/437
5,478,997 A   12/1995 Bridgelall et al.
(Continued)

*Primary Examiner* — Paultep Savusdiphol
(74) *Attorney, Agent, or Firm* — Additon, Higgins & Pendleton, P.A.

(57) ABSTRACT

A decodable indicia reading terminal can comprise a multiple pixel image sensor, an imaging lens configured to focus an image of decodable indicia on the image sensor, an analog-to-digital (A/D) converter configured to convert an analog signal read out of the image sensor into a digital signal, a communication interface, and a microprocessor configured to output decoded message data corresponding to the decodable indicia by processing the digital signal. The decodable indicia reading terminal can be configured, responsive to a triggering event, to transmit via the communication interface a decoding result and an indicia readability rating. The triggering event can be provided by a failure to detect decodable indicia, the indicia readability rating being less than a pre-defined threshold, exceeding a pre-defined time period to decode decodable indicia, a user interface action, and a command received via said communication interface.

20 Claims, 9 Drawing Sheets

(56) References Cited

U.S. PATENT DOCUMENTS

| | | | |
|---|---|---|---|
| 5,504,315 A | 4/1996 | Hardesty et al. | |
| 5,569,899 A | 10/1996 | Tedesco | |
| 5,597,997 A * | 1/1997 | Obata | G06K 7/10732 235/455 |
| 5,729,001 A | 3/1998 | Spitz | |
| 5,862,243 A * | 1/1999 | Baker | B07C 3/14 209/272 |
| 5,959,282 A * | 9/1999 | Tabuchi | G06K 7/1473 235/454 |
| 6,244,511 B1 | 6/2001 | Vandenberg et al. | |
| 6,585,157 B2 | 7/2003 | Brandt et al. | |
| 6,964,367 B2 | 11/2005 | O'Callaghan et al. | |
| 7,104,451 B1 * | 9/2006 | McCartney | G06K 5/02 235/462.01 |
| 7,219,841 B2 * | 5/2007 | Biss | G06K 7/089 235/454 |
| 7,347,376 B1 | 3/2008 | Biss et al. | |
| 7,600,687 B2 | 10/2009 | Biss et al. | |
| 8,636,212 B2 | 1/2014 | Nahill et al. | |
| 9,576,158 B2 | 2/2017 | Nahill et al. | |
| 2003/0057282 A1 | 3/2003 | Brandt et al. | |
| 2003/0111524 A1 | 6/2003 | Wells et al. | |
| 2004/0211838 A1 | 10/2004 | O'Callaghan et al. | |
| 2006/0118629 A1 * | 6/2006 | Shiramizu | G06K 7/10722 235/454 |
| 2008/0037891 A1 | 2/2008 | Koyatsu et al. | |
| 2008/0176543 A1 | 7/2008 | Gravel et al. | |
| 2009/0084847 A1 * | 4/2009 | He | G06K 7/10722 235/455 |
| 2009/0134225 A1 | 5/2009 | Koike et al. | |
| 2010/0044436 A1 * | 2/2010 | Powell | G06K 7/10732 235/455 |
| 2010/0084471 A1 | 4/2010 | Biss et al. | |
| 2010/0147948 A1 * | 6/2010 | Powell | G06K 7/10732 235/455 |
| 2011/0006115 A1 | 1/2011 | Nemet et al. | |
| 2011/0101103 A1 * | 5/2011 | Sauerwein, Jr. | G06K 7/10722 235/472.01 |
| 2011/0284637 A1 | 11/2011 | Powell et al. | |
| 2012/0193421 A1 * | 8/2012 | Sauerwein, Jr. | G06K 7/10722 235/455 |
| 2012/0284091 A1 * | 11/2012 | Colavito | G06Q 10/06398 705/7.42 |
| 2014/0131441 A1 | 5/2014 | Nahill et al. | |

\* cited by examiner

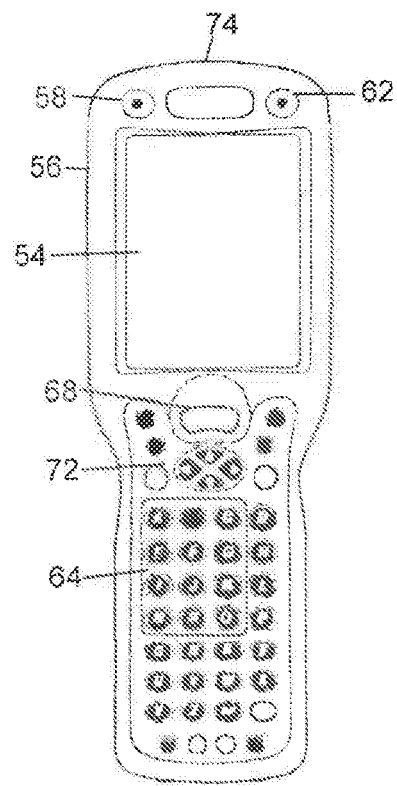 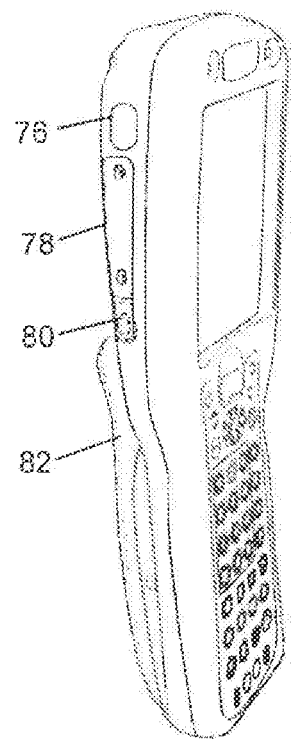
FIG. 1a FIG. 1b
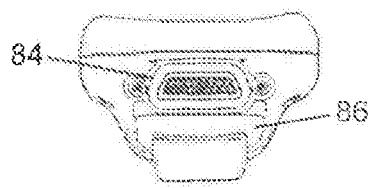
FIG. 1c

DECODABLE INDICIA READING TERMINAL WITH INDICIA ANALYSIS FUNCTIONALITY

CROSS-REFERENCE TO RELATED APPLICATIONS

The present application claims the benefit of U.S. patent application Ser. No. 15/007,293 for a Decodable Indicia Reading Terminal with Indicia Analysis Functionality filed Jan. 27, 2016 (and published Jul. 28, 2016 as U.S. Patent Publication No. 2016/0217305), now U.S. Pat. No. 9,576,158, which claims the benefit of U.S. patent application Ser. No. 14/160,645 for a Decodable Indicia Reading Terminal with Indicia Analysis Functionality filed Jan. 22, 2014 (and published May 15, 2014 as U.S. Patent Publication No. 2014/0131441), now U.S. Pat. No. 9,251,387, which claims the benefit of U.S. patent application Ser. No. 13/217,104 for a Decodable Indicia Reading Terminal with Indicia Analysis Functionality filed Aug. 24, 2011 (and published Feb. 28, 2013 as U.S. Patent Publication No. 2013/0048706), now U.S. Pat. No. 8,636,212. Each of the foregoing patent applications, patent publications, and patents is hereby incorporated by reference in its entirety.

FIELD OF THE INVENTION

This invention relates generally to decodable indicia reading terminals and, more specifically, to decodable indicia reading terminals comprising a digital imager.

BACKGROUND

The use of decodable indicia, such as bar code symbols, for product and article identification is well known in the art. Presently, various types of decodable indicia reading terminals have been developed, such as hand-held bar code scanners, hands-free scanners, bi-optic in-counter scanners, and mobile computers such as personal digital assistants (PDAs).

One common type of scan engine found in hand-held and retail scanners is the laser-based scan engine, which uses a focused laser beam to sequentially scan the bars and spaces of a bar code symbol pattern to be read. As the laser beam is scanned across the bar code symbol, a portion of the reflected light beam is collected by optics within the scanner. The collected light signal can subsequently be focused upon a photo-detector within the scanner. The photo-detector can, in one example, generate an analog electrical signal which can be converted into a digital signal representative of the bar code symbol.

Another common type of indicia reading terminal is the digital imager, which includes 1D (linear) imagers and 2D (area) imagers. Digital imagers typically utilize a lens to focus the image of the bar code onto a multiple pixel image sensor, which is often provided by a complementary metal-oxide semiconductor (CMOS) image sensor that converts light signals into electric signals.

SUMMARY

In one aspect, there is provided a decodable indicia reading terminal comprising a multiple pixel image sensor, an imaging lens configured to focus an image of decodable indicia on the image sensor, an analog-to-digital (A/D) converter configured to convert an analog signal read out of the image sensor into a digital signal, a communication interface, and a microprocessor configured to output decoded message data corresponding to the decodable indicia by processing the digital signal. The decodable indicia reading terminal can be configured, responsive to a triggering event, to transmit via the communication interface a decoding result and an indicia readability rating. In one embodiment, the triggering event can be provided by a failure to detect decodable indicia, the indicia readability rating being less than a pre-defined threshold, exceeding a pre-defined time period to decode decodable indicia, a user interface action, and a command received via said communication interface.

In another aspect, there is provided a decodable indicia reading terminal comprising an imager-based scanner and a laser-based scanner. The imager-based scanner can include a multiple pixel image sensor, an imaging lens configured to focus an image of decodable indicia on the image sensor, and an A/D converter configured to convert an analog signal read out of the image sensor into a digital signal. The laser-based scanner can include a laser source configured to emit a laser beam onto a substrate bearing decodable indicia, a photo-detector configured to receive a second beam of a variable intensity reflected by the decodable indicia and to output an analog signal representative of the variable intensity, and an A/D converter configured to convert the analog signal into a digital signal. The decodable indicia reading terminal can further comprise a communication interface and a microprocessor. The microprocessor can be configured to output a decoded message data corresponding to the decodable indicia by processing one of the digital signals. The decodable indicia reading terminal can be configured, responsive to a triggering event, to transmit via the communication interface a decoding result and an indicia readability rating. In one embodiment, the triggering event can be provided by a failure to detect decodable indicia by the laser-based scanner and/or imager-based scanner, the indicia readability rating being less than a pre-defined threshold, exceeding a pre-defined time period to decode decodable indicia, a user interface action, and a command received via said communication interface.

In a yet another aspect, there is provided a data collection system comprising at least one decodable indicia reading terminal and an external computer communicatively coupled to the decodable indicia reading terminal. The decodable indicia reading terminal can include including a multiple pixel image sensor, an imaging lens configured to focus an image of decodable indicia on the image sensor, an A/D converter configured to convert an analog signal read out of the image sensor into a digital signal, a communication interface, and a microprocessor configured to output decoded message data corresponding to the decodable indicia by processing the digital signal. The decodable indicia reading terminal can be configured, responsive to a triggering event, to transmit via the communication interface to the external computer a decoding result and an indicia readability rating. In one embodiment, the triggering event can be provided by a failure to detect decodable indicia, the indicia readability rating being less than a pre-defined threshold, exceeding a pre-defined time period to decode decodable indicia, a user interface action, and a command received via said communication interface.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIGS. 1a-1c schematically illustrate one embodiment of a decodable indicia reading terminal.

DETAILED DESCRIPTION

Figure 2:
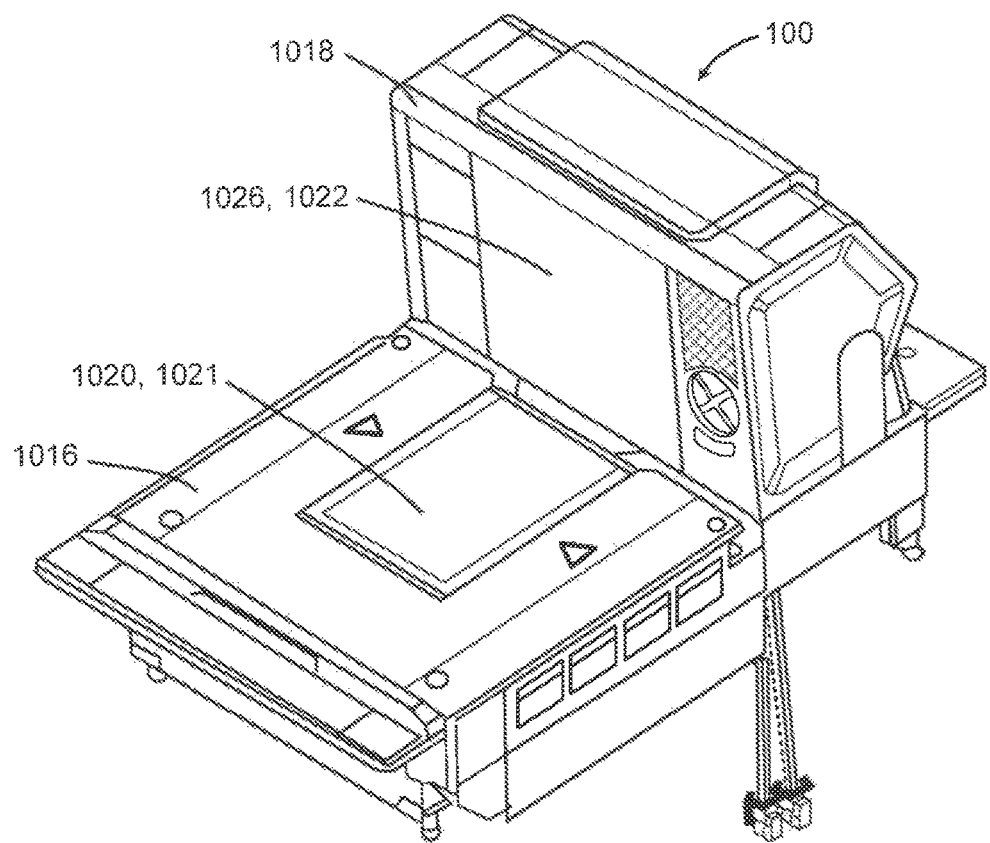
FIG. 2 schematically illustrates one embodiment of a bi-optic decodable indicia reading terminal.

Decodable indicia reading terminals are widely used in retail outlets, shipment facilities, warehouse facilities, etc. In many decodable indicia reading terminal usage scenarios, for example, in a retail checkout or an airport luggage handling system, there is a need to maintain a high throughput of items through the terminal in order not to create a bottle neck in the overall process. Indicia readability, however, can suffer due to a number of reasons: if, for example, decodable indicia is be provided by a bar code, the bar code can be torn, wrinkled, over-printed, under-printed, etc. Hence, a method of a decodable indicia reading terminal detecting, classifying and reporting operational problems caused by indicia having poor readability can be extremely important for improving the overall process efficiency.

In one embodiment, a decodable indicia reading terminal can be configured, responsive to detecting a difficult to read indicia (provided, e.g., by a bar code), to determine the indicia readability rating which, together with the decoding attempt result can be transmitted to an external computer, for example, to a point-of-sale (POS) cash register system, a local facility server (e.g., a retail store server), or a remote computer (e.g., a computer controlled by a supplier of an item tagged with a poorly readable bar code). The decoding result can be provided by an alphanumeric string containing a message decode by the bar code, or an error code indicating that all decoding attempts were unsuccessful. An image of the item bearing the indicia and/or additional information, such as a timestamp, the number of scanning attempts, and the processing time taken to decode the decodable indicia, can also be included into the transmission.

One embodiment of decodable indicia reading terminal 100 is shown in FIGS. 1a (front panel view), 1b (side panel view), and 1c (bottom panel view). Decodable indicia reading terminal 100 can comprise housing 52 within which other components of decodable indicia reading terminal 100 can be disposed. LCD screen display with touch screen sensor 54 can be disposed on the front panel 56. Also disposed on front panel 56 can be decode LED 58, scan led 62, and keyboard 64 including scan key 68 and navigation keys 72. Imaging window 74 can be disposed on the top panel of housing 52. Disposed on the side panel (best viewed in FIG. 1b) can be infra-red communication port 76, access door to a secure digital (SD) memory interface 78, audio jack 80, and hand strap 82. Disposed on the bottom panel (best viewed in FIG. 1c) can be multi-pin mechanical connector 84 and hand strap clip 86.

The decodable indicia reading terminal 100 can be used, for example, for bar code reading and decoding in POS and other applications. A skilled artisan would appreciate the fact that other uses of decodable indicia reading terminal 100 are within the scope of this disclosure.

A product having decodable indicia can be scanned by the decodable indicia reading terminal 100. As used herein, "decodable indicia" is intended to denote an encoded representation, such as the representation in a bar code symbology, of a message string comprising alphanumeric and non-alphanumeric characters. Decodable indicia can be used to convey information, such as the identification of the source and the model of a product, for example in a UPC bar code that can comprises six, eight, twelve or thirteen encoded symbol characters representing numerical digits. The decodable indicia reading terminal can be configured to output a decoded message data corresponding to the decodable indicia.

While FIGS. 1a-1c illustrate a hand held housing, a skilled artisan would appreciate the fact that other types and form factors of terminal housings are within the scope of this disclosure. For example, FIG. 2 illustrates one embodiment of a bi-optic decodable indicia reading terminal which can be incorporated into a POS workstation with a presentation housing. The bi-optic terminal 100 can include a first housing portion 1016 and a second housing portion 1018 which can project from one end of the first housing portion in a substantially orthogonal manner. In one embodiment, the first housing portion 1016 can comprise a laser-based indicia scanner, and the second housing portion 1018 can comprise an imager-based scanner. The first housing portion 1016 can include a first optically transparent (e.g., glass) horizontal-scanning window 1020 behind which a laser-based scanner 1021 can be disposed. The second housing portion 1018 can include a second optically transparent (e.g., glass) horizontal-scanning window 1026 behind which an imager-based scanner 1022 can be disposed. A skilled artisan would appreciate the fact that other ways of disposing the scanners and scanning windows are within the scope of this disclosure.

The bi-optic scanner configuration described herein supra is exemplary, and is not limited to a construction having horizontal and vertical scan windows. In another embodiment, a bi-optic scanner can include a single scan window, with a laser-based scanner and an imager-based scanner disposed behind it. A skilled artisan would appreciate the fact that other arrangements of the laser-based scanner and imager-based scanner within the housing of the decodable indicia reading terminal and relative to one or more scanning windows are within the scope of this disclosure.

Figure 3:
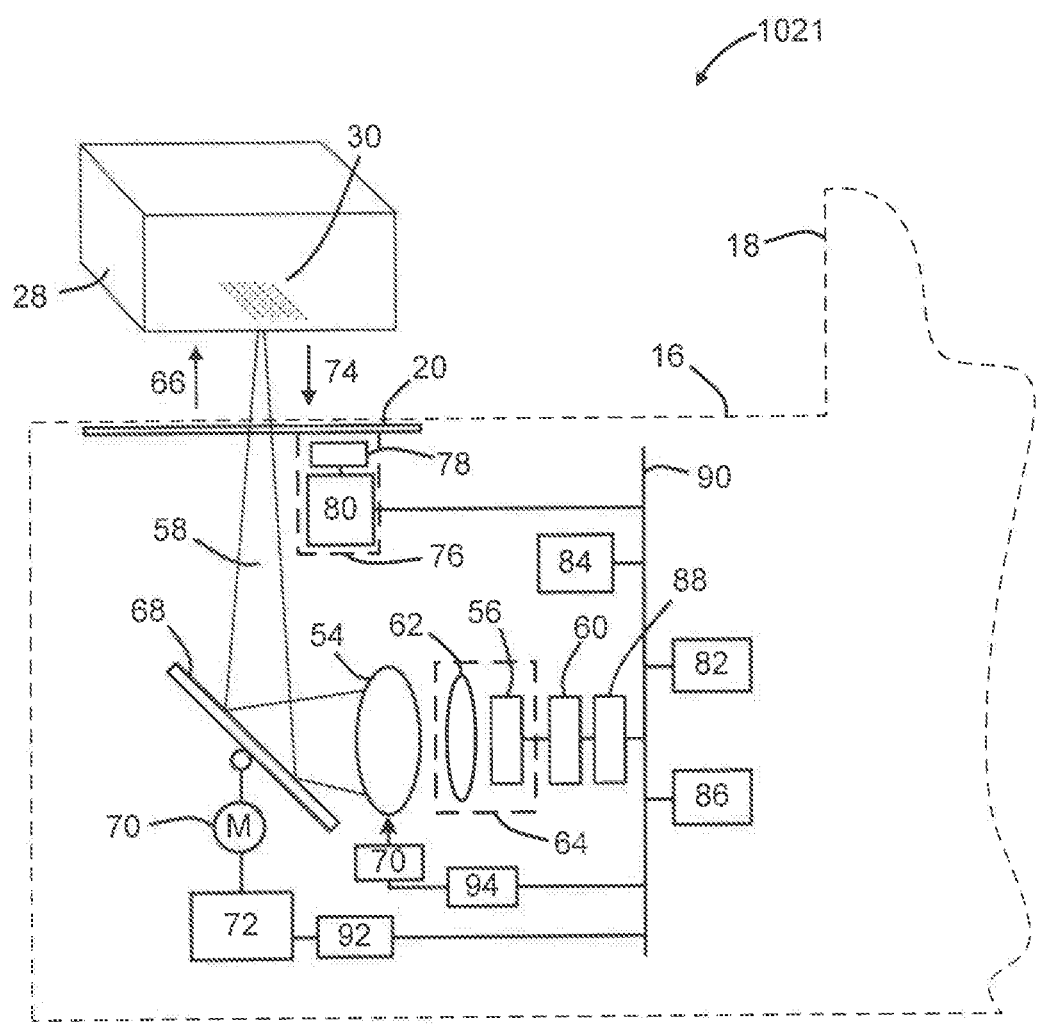
FIG. 3 illustrates a component diagram of a laser-based scanner which can be incorporated in one embodiment of the indicia reading terminal.

FIG. 3 illustrates a component diagram of a laser-based scanner which can be incorporated in one embodiment of the indicia reading terminal 100. The laser-based scanner 1021 can comprise a lens assembly 54, which can include a fixed lens, a variable position lens holder adapted for use with a moveable lens system, or a variable focus fluid lens, for example. The laser scanner 12 can further comprise a laser source 56 which can emit a laser beam. The laser source 56 can be coupled to a laser source control circuit 60. Light from the laser source 56 can be shaped by the collimating optics 62 and the lens assembly 54. The combination of the laser source 56 and the collimating optics 62 can be regarded as a laser diode assembly 64. The laser beam emitted by the laser source 56 can illuminate the substrate 28, which in one embodiment can bear the decodable indicia 30. A scanning mirror reflector 68 disposed within the optical path of the laser beam emitter by the laser source 56 can oscillate to direct the laser beam across the entire surface to be scanned. Reflector 68 can be driven by a scan motor 70 which can be coupled to control circuit 72.

The laser beam emitted by the laser source 56 can reflect off the product 28 and then travel back to the photo-detector assembly 76. In the example wherein the product 28 includes a bar code, the incident laser light can be reflected by areas of dark and white bands. The reflected beam can thus have variable intensity representative of the bar code pattern. Photo-detector assembly 76 including photo-detector 78 and analog-to-digital (A/D) converter 80 can receive the reflected beam of variable intensity, generate an analog signal corresponding to the reflected beam, and convert it to a digital signal representative of the beam intensity for storage into memory 82 where it can be processed by microprocessor 84 in accordance with a program stored in the non-volatile memory 86, provided in a particular example by an EPROM.

For attempting to decode a bar code symbol, microprocessor 84 can process a digital signal corresponding to the reflected laser beam to determine a spatial pattern of dark cells and light cells and can then convert each light and dark cell pattern determined into a character of character string via table lookup, and finally can output a decoded message data corresponding to the decodable indicia.

In a further aspect, laser scanner 12 can include various interface circuits allowing microprocessor 84 to communicate with various circuits of scanner 12 including first interface circuit 88 coupled to laser source control circuit 60 and system bus 90, second interface circuit 92 coupled to motor control circuit 72, and third interface circuit 94 coupled to electrical power input unit 96.

Figure 4:
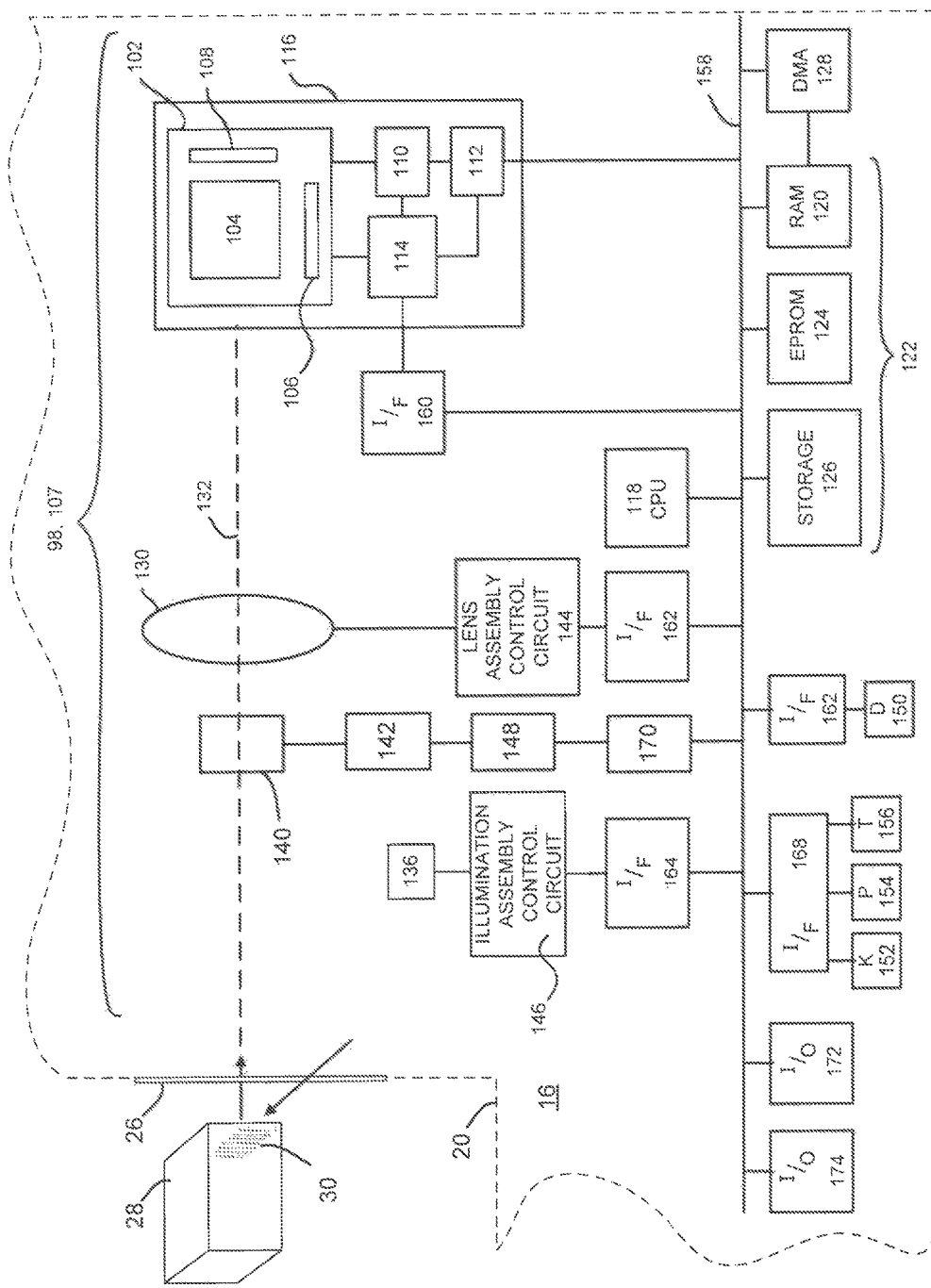
FIG. 4 illustrates a component diagram of an imager-based scanner which can be incorporated in one embodiment of the indicia reading terminal.

Referring now to FIG. 4, described is a component diagram of an imager-based scanner which can be incorporated in one embodiment of the indicia reading terminal 100. The imager-based scanner 98 can comprise a multiple pixel image sensor assembly 107, or optical imager, such as a CCD image sensor or a CMOS image sensor.

The image sensor assembly 107 can include an image sensor 102 comprising a multiple pixel image sensor 104 having pixels arranged in rows and columns of pixels, column circuitry 106, and row circuitry 108. Associated with the image sensor 102 can be amplifier circuitry 110, and an A/D converter 112 which can convert image information in the form of analog signals read out of multiple pixel image sensor 104 into image information in the form of digital signals. Image sensor 102 can also have an associated timing and control circuit 114 for use in controlling, e.g., the exposure period of image sensor 102, and/or gain applied to the amplifier 110. The noted circuit components 102, 110, 112, and 114 can be packaged into a common image sensor integrated circuit 116.

In one embodiment, image sensor integrated circuit 116 can incorporate a Bayer pattern filter, and microprocessor 118 prior to subjecting a frame to further processing can interpolate pixel values for development of a monochrome frame of image data.

In the course of operation of the image sensor assembly 107, image signals can be read out of image sensor 102, converted and stored into a system memory such as RAM 120. A memory 122 of image sensor assembly 107 can include RAM 120, a nonvolatile memory such as EPROM 124, and a storage memory device 126 such as may be provided by a flash memory or a hard drive memory. In one embodiment, image sensor assembly 107 can include microprocessor 118 which can be adapted to read out image data stored in memory 122 and subject such image data to various image processing algorithms. Image sensor assembly 107 can include a direct memory access unit (DMA) 128 for routing image information read out from image sensor 102 that has been subject to conversion to RAM 120. In another embodiment, image sensor assembly 107 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 102 and RAM 120 are within the scope of this disclosure.

In a further aspect, the image sensor assembly 107 can include an imaging lens assembly 130 for focusing an image of the decodable indicia 30 onto image sensor 102. Imaging light rays can be transmitted about an optical axis 132. Lens assembly 130 can be controlled with use of lens assembly control circuit 144. Lens assembly control circuit 144 can send signals to lens assembly 130, e.g., for changing a focal length and/or a best focus distance of lens assembly 130.

Image sensor assembly 107 can include various interface circuits for coupling several of the peripheral devices to system address/data bus (system bus) bus 158, for communication with second microprocessor 118 also coupled to system bus 158. Image sensor assembly 107 can include interface circuit 160 for coupling image sensor timing and control circuit timing and control circuit 144 to system bus 158, interface circuit 162 for coupling the lens assembly control circuit 144 to system bus 158, interface circuit 164 for coupling the illumination assembly control circuit 146 to system bus 158, interface circuit 166 for coupling the display 150 to system bus 158, interface circuit 168 for coupling keyboard 152, pointing device 154, and trigger 156 to system bus 158, and interface circuit 170 for coupling the filter module control circuit 148 to system bus 158.

In a further aspect, image sensor assembly 107 can include one or more I/O interfaces 172, 174 for providing communication with external devices (e.g., a POS cash register computer, a retail store server, an inventory facility server, a local area network base station, or a cellular base station). I/O interfaces 172, 174 can be interfaces of any combination of known computer interfaces, e.g., Ethernet (IEEE 802.3), USB, IEEE 802.11, Bluetooth, CDMA, and GSM.

Figure 5:
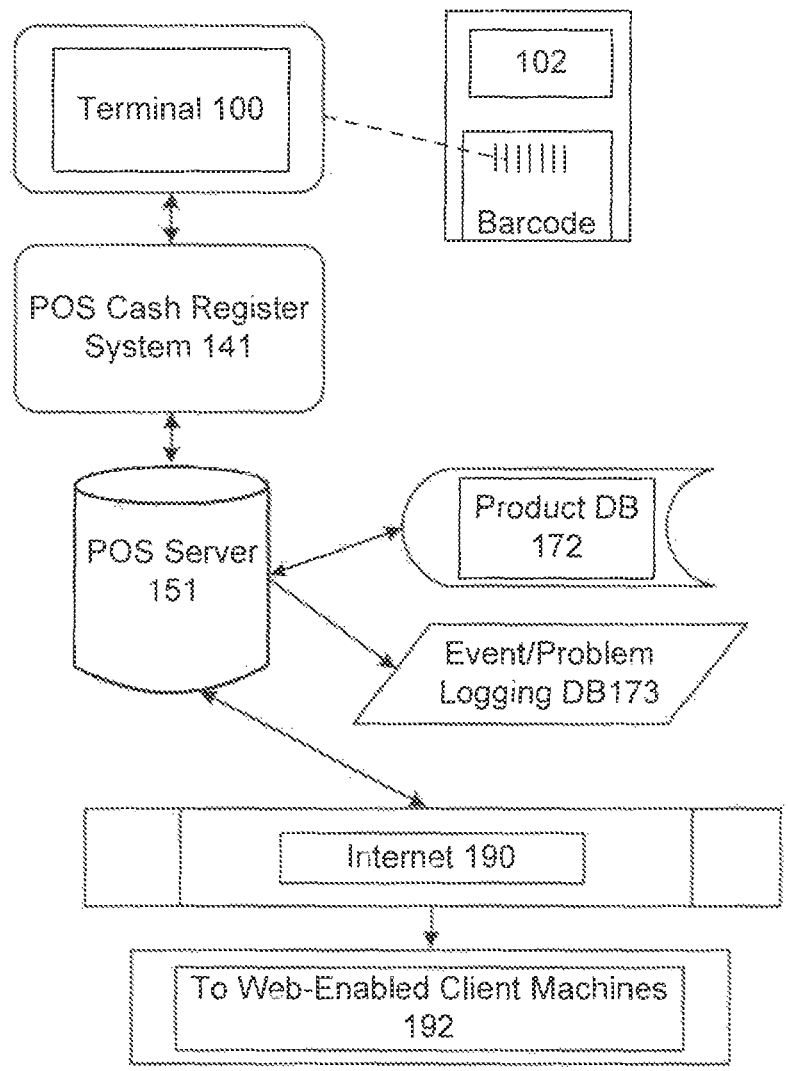
FIGS. 5-6 depict various embodiments of a data collection system employing decodable indicia reading terminals.

In another aspect, decodable indicia reading terminal 100 can be incorporated in a data collection system. One embodiment of a data collection system, schematically shown in FIG. 5, can include a decodable indicia reading terminal 100 in communication with a POS cash register computer 141 via a wired or wireless interface. POS cash register computers can be in communication with a POS server 151 (e.g., over a local area network). POS server 151 can be in communication with a product database 172 (e.g., over a local or wide area network) and event/problem logging database 173 (e.g., over a local or wide area network). POS server 151 can be in communication with one or more web-enabled clients 191 over the Internet 190.

Figure 6:
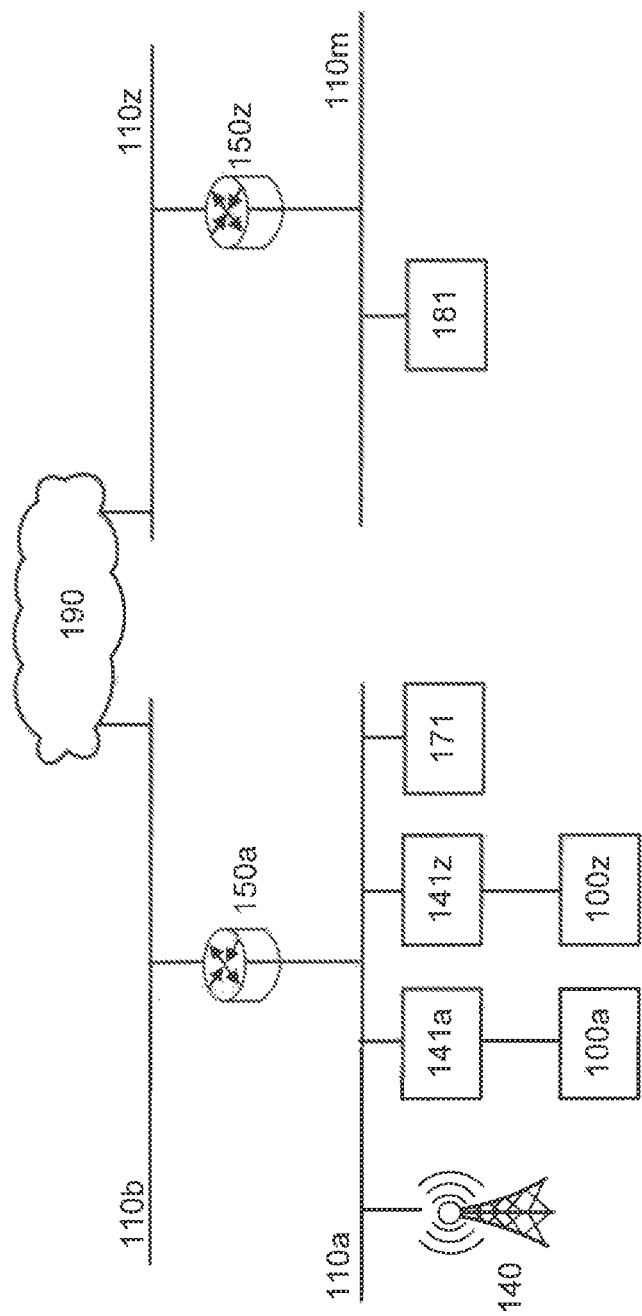

Another embodiment of a data collection system is schematically shown in FIG. 6. The data collection system can include a plurality of decodable indicia reading terminals 100a-100z. Each terminal 100a-100z can be in communication with a POS cash register computer 141a-141z via a wired or wireless interface. POS cash register computers can be in communication with external computer 171 (which can be provided, e.g., by a retail store server) over a local area network 110a. In one embodiment, local area network 110a can be connected to the Internet 190 over one or more routers 150a-150z. In one embodiment, retail store server 171 can be in communication with a remote computer 191 (e.g., a computer controlled by a supplier of one or more retail items) over one or more local area networks 150a-150z and/or over the Internet 190.

In one embodiment, one or more decodable indicia reading terminals 100a-100z can be in communication with retail store server 171 via one or more wireless access points 140a-140z. In one embodiment, network frames can be exchanged by terminal 100c and retail store server 171 via one or more routers, base stations, and other infrastructure elements. In another embodiment, external computer 171 can be reachable by terminal 100c via a local area network (LAN). In a yet another embodiment, external computer 171 can be reachable by terminal 100c via a wide area network (WAN). A skilled artisan would appreciate the fact that other methods of providing interconnectivity between terminal 100c and external computer 171 relying upon LANs, WANs, virtual private networks (VPNs), and/or other types of network are within the scope of this disclosure. In one embodiment, the communications between terminal 100c and external computer 171 can comprise a series of HTTP requests and responses transmitted over one or more TCP connections, although a person skilled in the art would appreciate the fact that using other transport and application level protocols is within the scope of this disclosure.

As indicated herein supra, decodable indicia reading terminal 100 can be configured, responsive to a pre-defined triggering event, to determine the indicia readability rating which, together with the decoding attempt result can be transmitted to external computer 171. The decoding result can be provided by an alphanumeric string containing a decoded bar code message, or an error code indicating that all decoding attempts were unsuccessful. An image of the item bearing the indicia and/or additional information, such as a timestamp, the number of scanning attempts, bar code quality, and the processing time taken to decode the decodable indicia can also be included into the transmission. A decoding result accompanied by an image of the item bearing the indicia and/or additional information can be referred to as an extended decoding result.

In a further aspect, the triggering events, responsive to which terminal 100 can return an extended decoding result, can include a failure to detect a decodable bar code within a pre-defined time or after a pre-defined number of scanning attempts, exceeding a pre-defined time to decode the bar code, exceeding a pre-defined number of decoding attempts, a user interface action (e.g., a push button), and an external event (e.g., a command received from an external computer). In one embodiment, a triggering event can occur responsive to a failure by laser-based scanner 12 to decode indicia which was successfully decoded by imager-based scanner 98.

In another aspect, the indicia readability rating can be expressed by an integer value from a pre-defined range (for example, 1 to 10, or A to F). In one embodiment, the value of the indicia readability rating can be inversely proportional to the number of decoding attempts. In another embodiment, the value of the indicia readability rating can be inversely proportional to the processing time taken to decode the decodable indicia. In a yet another embodiment, the value of the indicia readability rating can be initially assigned the maximum value and then for every defect detected a pre-defined value can be subtracted from the current rating value. In a yet another embodiment, the value of the indicia readability rating can be proportional to the ratio of the average color intensity of the printed areas and the average color intensity of the background areas of the substrate on which the bar code is printed. In a yet another embodiment, the value of the indicia readability rating can be inversely proportional to the sharpness of the printable elements edges (which, in turn, can be expressed as a width, in pixels, of bar edges having the color intensity between the average color intensity of the printed areas and the average color intensity of the background areas). In a yet another embodiment, the value of the indicia readability rating can reflect the degree of overprint or underprint of the bar code. A skilled artisan would appreciate the fact that other ways of determining the indicia readability rating are within the scope of this disclosure.

As noted herein supra, in one embodiment, decodable indicia reading terminal 100 can be incorporated in a data collection system comprising at least one external computer 171 which can be provided, for example, by a POS cash register computer, a local facility server (e.g., a retail store server), or a remote server (e.g., a server controlled by a manufacturer of an item tagged with a poorly readable bar code). In one embodiment, decodable indicia reading terminal 100 can be configured, responsive to detecting a triggering event described herein supra, to transmit an extended decoding result to POS cash register computer 141. In one embodiment, POS cash register computer can be configured, responsive to receiving an extended decoding result from a decodable indicia reading terminal, to transmit the extended decoded result to the retail store server. In another embodiment, a decodable indicia reading terminal 100 can be configured, responsive to detecting a triggering event described herein supra, to transmit an extended decoding result to both POS cash register computer 141 and retail store server 171.

In one embodiment, external computer 171 can be configured to diagnose a tag printer failure responsive to establishing that a plurality of items bearing tags produced by a particular tag printer cause an error rate exceeding a pre-defined threshold rate. For example, a retail store server can receive from several decodable indicia reading terminals a number of messages indicating indicia readability errors related to items originated from a given department. Should the error rate (calculated, e.g., as a ratio of a number of items causing read errors to a total number of items originated from a given department) exceed a configurable pre-defined threshold (e.g., 20%), a service call for the department's bar code printer can automatically be initiated by the retail store server.

In one embodiment, external computer 171 can be configured to diagnose an item-related issue responsive to establishing that a plurality of copies of a same SKU item cause an error rate exceeding a pre-defined threshold rate. For example, a retail store server can receive from several decodable indicia reading terminals a number of messages indicating indicia readability errors related to the same SKU item. Should the error rate (calculated, e.g., as a ratio of a number of items causing read errors to a total number of scanned items having a given SKU) exceed a configurable pre-defined threshold (e.g., 20%), a problem ticket can automatically be transmitted by the retail store server to the item supplier or manufacturer.

In one embodiment, external computer 171 can be configured to diagnose a terminal-related issue responsive to establishing that decoding operations performed by a particular terminal has an error rate exceeding a pre-defined threshold rate. For example, a retail store server can receive, from a particular decodable indicia reading terminal, a number of messages indicating indicia readability errors related to different SKU items. Should the error rate (calculated, e.g., as a ratio of a number of items causing read errors to a total number of items scanned by the decodable indicia reading terminal) exceed a configurable pre-defined threshold (e.g., 20%), a service call for the terminal can automatically be initiated by the retail store server.

In a further aspect, the communications between decodable indicia reading terminal 100 and POS cash register computer 141 and/or external computer 171 can occur over various application-level and transport-level protocols, including, e.g., a custom application-level protocol over TCP or a custom application-level protocol over HTTP. In a further aspect, the communications between retail store server 171 and a remote computer 191 (e.g., a computer controlled by a supplier of one or more retail items) can occur over various application-level and transport-level protocols, including, e.g., a custom application-level protocol over TCP, a custom application-level protocol over HTTP, or a custom application-level protocol over SMTP. A skilled artisan would appreciate the fact that other application-level and transport-level protocols are within the scope of this disclosure.

Figure 7A:
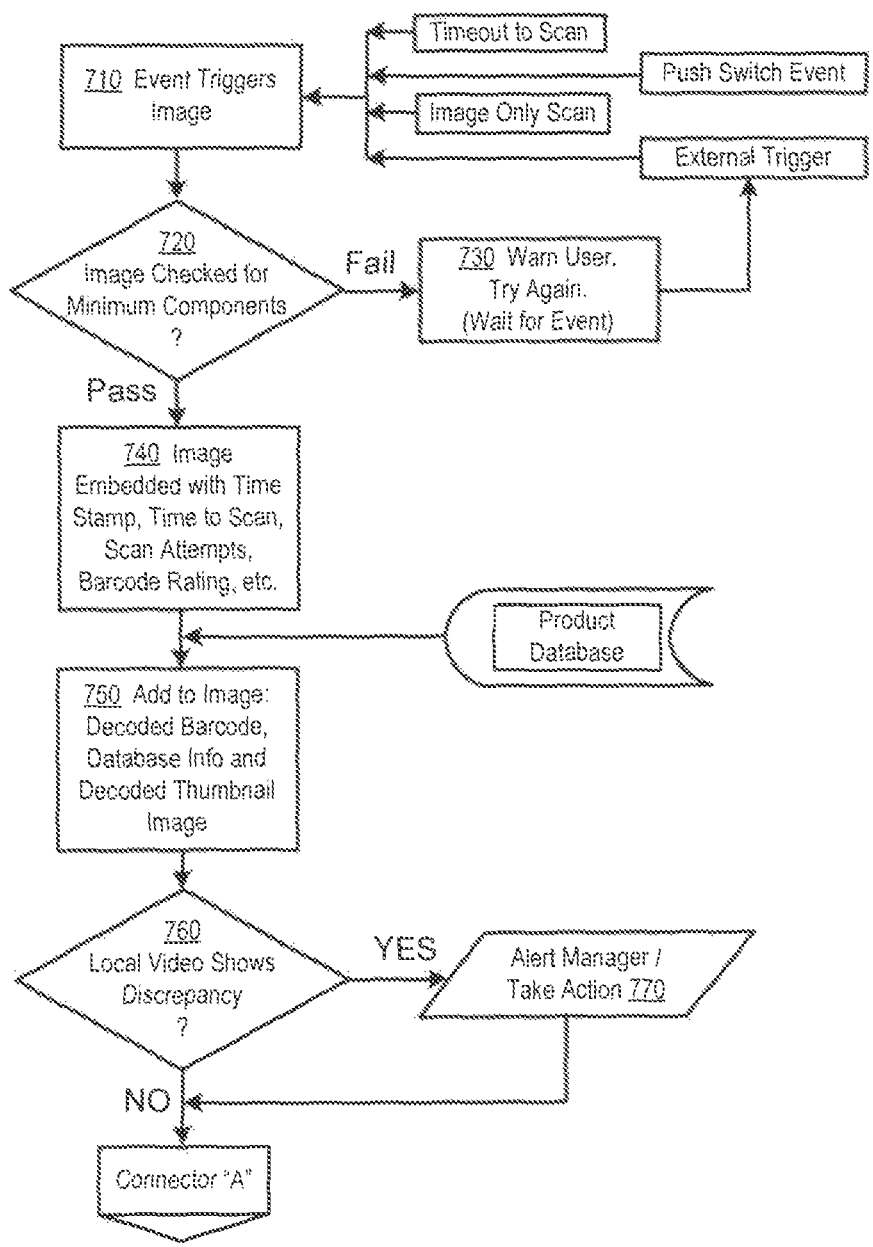
FIGS. 7a, 7b, and 8 depict flowcharts of various embodiments of a method of scanning decodable indicia by the indicia reading terminal.
Figure 7B:
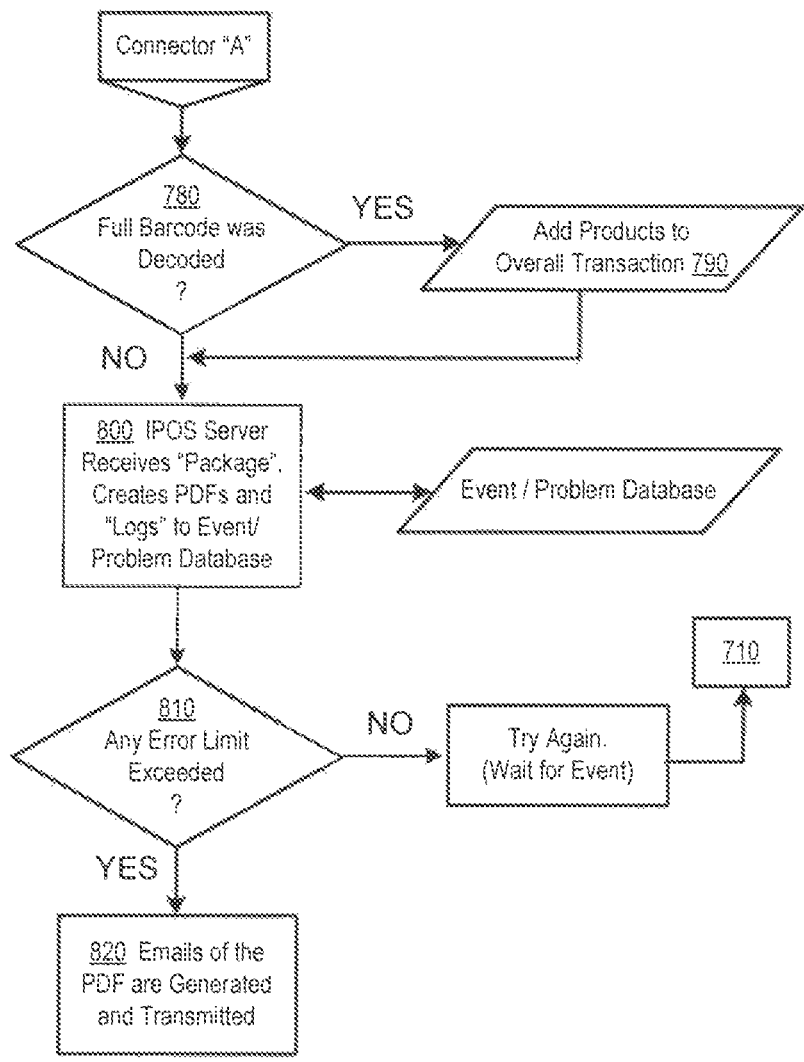

One embodiment of a method of processing an indicia bearing item by a POS server including an indicia reading terminal 100 is now being described with references to FIGS. 7a-7b.

At step 710, terminal 100 can, responsive to a triggering event (e.g., a timeout to scan, a button event, a failure to detect a decodable indicia within an image, or an external triggering event) can take an image of the item bearing the decodable indicia.

Responsive to ascertaining at step 710 that the image contains one or more necessary components (e.g., an indicia bearing item), terminal 100 can continue processing at step 720. Otherwise, at step 730, a warning message can be given to the POS server user, and the method can loop back to step 710.

At step 740, terminal 100 can compose an extended decoding result including the image of the indicia bearing item, a timestamp, the processing time taken to decode the decodable indicia, the number of scanning/decoding attempts, and/or bar code quality rating.

At step 750, terminal 100 can look up the decoded product code in the product database and supplement the extended decoding result with the decoded bar code message, the product information received from the product database, and/or item image received from the product database.

At step 760, responsive to detecting a significant discrepancy between the item image taken by terminal 100 and the image received from the product database (e.g., if the two images show substantially different items), a remedial action can be taken (e.g., a voice and/or page notification can be transmitted to the store manager via a phone line, a wireless phone, and/or a pager). Otherwise, the processing can continue at step 780.

At step 780, responsive to establishing that a full bar code was successfully decoded, the scanned indicia bearing item can be added by POS server to the overall payment transaction. Otherwise, processing can continue at step 800.

At step 800, POS server can create a record in the event/problem database. The record can include the extended decoded result formed by EIR terminal 100 at steps 710-750.

At step 800, responsive to establishing that an error limit was exceeded for a given item or for several items, POS server can generate and transmit notifications (e.g., e-mail messages) to the supplier of the item(s) for which an error limit was exceeded. Otherwise, the method can loop back to step 710.

Figure 8:
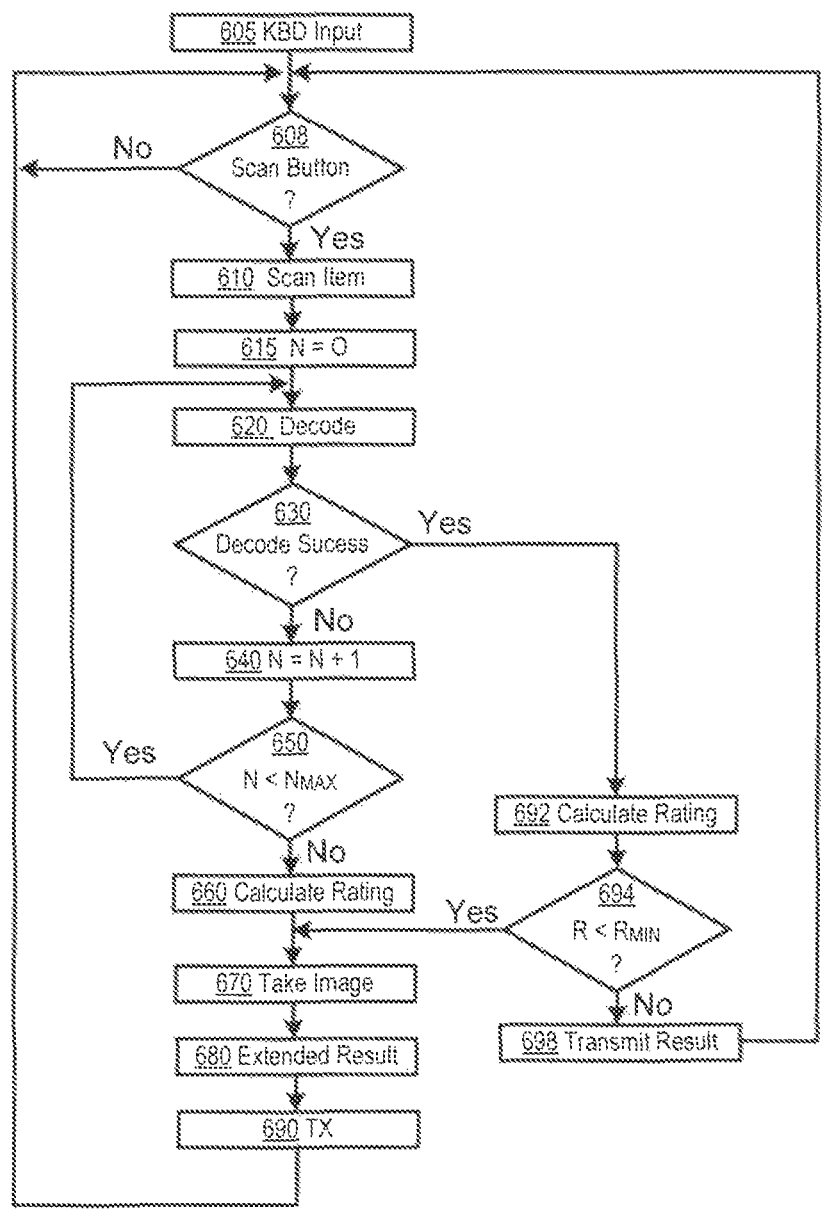

Another embodiment of a method of scanning decodable indicia by indicia reading terminal 100 is now being described with references to FIG. 8.

At steps 605-608, terminal 100 can ascertain whether Scan button has been pressed by the terminal's user. A skilled artisan would appreciate the fact that other ways of initiating a scanning operation are within the scope of this disclosure.

At step 615, terminal 100 can initialize a counter of decoding attempts.

At step 620, terminal 100 can perform a decoding operation.

Responsive to determining at step 100 that the decoding operation was successful, terminal 100 can continue processing at step 692.

Responsive to determining at step 100 that the decoding operation was unsuccessful, terminal 100 can, at step 640, increment the counter of decoding attempts.

Responsive to determining at step 650 that counter of decoding attempts does not exceed a pre-defined threshold value, the method loop back to step 620.

Responsive to determining at step 650 that counter of decoding attempts exceeds a pre-defined threshold value, the processing can continue at step 660.

At step 660, terminal 100 can calculate an indicia readability rating.

At step 670, terminal 100 can take an image of the item bearing the decodable indicia.

At step 680, terminal 100 can compose an extended decoding result which can comprise the decoding result and the indicia readability rating. The extended decoding result can further comprise an image of the item bearing the decodable indicia, a timestamp, the number of scanning attempts, and the processing time taken to decode the decodable indicia.

At step 690, terminal 100 can transmit the extended decoding result to an external computer, and the method can loop back to step 605.

At step 692, terminal 100 can calculate the indicia readability rating.

Responsive to determining at step 694 that the indicia readability rating is less than a pre-defined threshold value, processing can continue at step 670.

Responsive to determining at step 694 that the indicia readability rating exceeds a pre-defined threshold value, terminal 100 can, at step 698, transmit an extended decoding result to an external computer, and the method can loop back to step 605.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

A sample of systems and methods that are described herein follows:

A1. A decodable indicia reading terminal comprising:
a multiple pixel image sensor;
an imaging lens configured to focus an image of decodable indicia on said image sensor;
an analog-to-digital (A/D) converter configured to convert an analog signal read out of said image sensor into a digital signal;
a microprocessor communicatively coupled to a system bus, said microprocessor configured to output decoded message data corresponding to said decodable indicia by processing said digital signal;
a communication interface communicatively coupled to said system bus;
wherein said decodable indicia reading terminal is configured, responsive to a triggering event, to transmit via said communication interface a decoding result and an indicia readability rating.

A2. The decodable indicia reading terminal of A1, wherein said triggering event is selected from the group consisting of: a failure to detect decodable indicia, said indicia readability rating being less than a pre-defined threshold, exceeding a pre-defined time period to decode decodable indicia, a user interface action, and a command received via said communication interface.

A3. The decodable indicia reading terminal of A1, wherein said decoding result is selected from the group consisting of: said decoded message data and an error message.

A4. The decodable indicia reading terminal of A1, further comprising a laser-based scanner including a laser source configured to emit a laser beam onto a substrate bearing decodable indicia, a photo-detector configured to receive a second beam of a variable intensity reflected by said decodable indicia and to output a second analog signal representative of said variable intensity, and a second A/D converter configured to convert said second analog signal into a second digital signal;
wherein said microprocessor if further configured to output decoded message data corresponding to said decodable indicia by processing said second digital signal; and
wherein said triggering event is provided by a failure to detect decodable indicia by said laser-based scanner.

A5. The decodable indicia reading terminal of A1, wherein said decodable indicia reading terminal is further configured to transmit via said communication interface at least one of: a timestamp, an image of an item bearing said decodable indicia, a number of scanning attempts, and a processing time taken to decode the decodable indicia.

A6. The decodable indicia reading terminal of A1 configured to operate in a data collection system, said data collection system including an external server communicatively coupled to said decodable indicia reading terminal;
wherein said decodable indicia reading terminal is further configured to transmit said decoding result and said indicia readability rating to said external server via said communication interface.

B1. A decodable indicia reading terminal comprising:
an imager-based scanner, said imager-based scanner including a multiple pixel image sensor, an imaging lens configured to focus an image of decodable indicia on said image sensor, and a first A/D converter configured to convert a first analog signal read out of said image sensor into a first digital signal;
a laser-based scanner, said laser-based scanner including a laser source configured to emit a laser beam onto a substrate bearing decodable indicia, a photo-detector configured to receive a second beam of a variable intensity reflected by said decodable indicia and to output a second analog signal representative of said variable intensity, and a second A/D converter configured to convert said second analog signal into a first digital signal;
a microprocessor configured to output a decoded message data corresponding to said decodable indicia by processing at least one of: said first digital signal, said second digital signal;
a communication interface communicatively coupled to said system bus;
wherein said decodable indicia reading terminal is configured, responsive to a triggering event, to transmit via said communication interface a decoding result and an indicia readability rating.

B2. The decodable indicia reading terminal of B1, wherein said triggering event is selected from the group consisting of: a failure to detect decodable indicia by said laser-based scanner, a failure to detect decodable indicia by said imager-based scanner, said indicia readability rating being less than a pre-defined threshold, exceeding a pre-defined time period to decode decodable indicia, a user interface action, and a command received via said communication interface.

B3. The decodable indicia reading terminal of B1, wherein said decoding result is selected from the group consisting of: said decoded message data and an error message.

B4. The decodable indicia reading terminal of B1, wherein said decodable indicia reading terminal is further configured to transmit via said communication interface at least one of: a timestamp, an image of an item bearing said decodable indicia, a number of scanning attempts, and a processing time taken to decode the decodable indicia.

B5. The decodable indicia reading terminal of B1 configured to operate in a data collection system, said data collection system including an external server communicatively coupled to said decodable indicia reading terminal;
wherein said decodable indicia reading terminal is further configured to transmit said decoding result and said indicia readability rating to said external server via said communication interface.

C1. A data collection system comprising:
at least one decodable indicia reading terminal comprising a multiple pixel image sensor, an imaging lens configured to focus an image of decodable indicia on said image sensor, an A/D converter configured to convert an analog signal read out of said image sensor into a digital signal, a microprocessor communicatively coupled to a system bus and configured to output decoded message data corresponding to said decodable indicia by processing said digital signal, and a communication interface communicatively coupled to said system bus;
an external server communicatively coupled to said at least one decodable indicia reading terminal;
wherein said decodable indicia reading terminal is configured, responsive to a triggering event, to transmit via said communication interface to said external server a decoding result and an indicia readability rating.

C2. The data collection system of C1, wherein said triggering event is selected from the group consisting of: a failure to detect decodable indicia, said indicia readability rating being less than a pre-defined threshold, exceeding a pre-defined time period to decode decodable indicia, a user interface action, and a command received via said communication interface.

C3. The data collection system of C1, wherein said decoding result is selected from the group consisting of: said decoded message data and an error message.

C4. The data collection system of C1, wherein said external server is configured to diagnose at least one of:
a tag printer failure responsive to establishing that a plurality of items bearing tags produced by said tag printer cause an error rate exceeding a first pre-defined threshold rate;
an item-related issue responsive to establishing that a plurality of copies of a same SKU item cause an error rate exceeding a second pre-defined threshold rate; and
a terminal-related issue responsive to establishing that decoding operations performed by said decodable indicia reading terminal has an error rate exceeding a third pre-defined threshold rate.

C5. The data collection system of C1, wherein said first pre-defined threshold rate is calculated by averaging a plurality of indicia readability ratings of tags produced by a specific tag printer, said plurality of indicia readability ratings outputted by two or more decodable indicia reading terminals of said data collection system.

C6. The data collection system of C1, wherein said second pre-defined threshold rate is calculated by averaging a plurality of indicia readability ratings of tags attached to a specific SKU item, said plurality of indicia readability ratings outputted by two or more decodable indicia reading terminals of said data collection system.

C7. The data collection system of C1, wherein said third pre-defined threshold rate is calculated by averaging a plurality of indicia readability ratings outputted by two or more decodable indicia reading terminals of said data collection system.

The invention claimed is:

1. An indicia reader, comprising:
an image sensor for generating a first signal;
an imaging lens for focusing light on the image sensor;
a source for emitting light;
a photo-detector for receiving reflected light and generating a second signal corresponding to the intensity of the reflected light;
a communication interface for transmitting data; and
a microprocessor communicatively coupled to the image sensor, the photo-detector, and the communication interface, the microprocessor being configured for:
in response to a triggering event, generating a decoding result;
in response to the triggering event, determining an indicia readability rating; and
in response to the triggering event, transmitting the decoding result and the indicia readability rating via the communication interface;
wherein the triggering event comprises a failure to decode indicia represented in the second signal which was successfully decoded as represented in the first signal.

2. The indicia reader of claim 1, wherein the triggering event comprises a failure to detect indicia, an indicia readability rating of less than a pre-defined threshold, an attempt to decode indicia that exceeds a pre-defined time period, a user interface action, and a command received via the communication interface.

3. The indicia reader of claim 1, wherein the indicia readability rating is determined based on:
a ratio of an average color intensity of printed areas and an average color intensity of background areas on a substrate bearing printed indicia;
a sharpness of the printed indicia's edge elements; and/or
a degree of overprint or underprint of the printed indicia.

4. The indicia reader of claim 1,
wherein the microprocessor is configured for:
in response to the triggering event, determining an indicia readability rating corresponding to the decoding result based on a number of attempts to decode an indicia and a processing time taken to successfully decode the indicia.

5. The indicia reader of claim 1, wherein the microprocessor is configured for, in response to the triggering event, transmitting a timestamp, an image of an item bearing the indicia, a number of attempts to decode an indicia and/or a processing time taken to decode the indicia.

6. The indicia reader of claim 1, wherein the microprocessor is configured for, in response to the triggering event, transmitting the decoding result and the indicia readability rating via the communication interface to an external server.

7. An indicia reader comprising:
an image sensor for generating a first signal;
an imaging lens for focusing light on the image sensor;
a source for emitting a light beam;
a photo-detector for receiving reflected light and generating a second signal corresponding to the intensity of the reflected light;
a communication interface for transmitting data; and
a microprocessor communicatively coupled to the image sensor, the photo-detector, and the communication interface, the microprocessor being configured for:
in response to a triggering event, generating a decoding result;
in response to the triggering event, determining an indicia readability rating; and
in response to the triggering event, transmitting the decoding result and the indicia readability rating via the communication interface;
wherein the triggering event comprises successfully decoding indicia represented in the first signal which was unsuccessfully decoded as represented in the second signal.

8. The indicia reader of claim 7, wherein the triggering event comprises a failure to detect indicia, an indicia readability rating of less than a pre-defined threshold, an attempt to decode indicia represented in the first and/or second signal that exceeds a pre-defined time period, a user interface action, and a command received via the communication interface.

9. The indicia reader of claim 7, wherein the indicia readability rating is determined based on:
a ratio of an average color intensity of printed areas and an average color intensity of background areas on a printable substrate bearing printed indicia;
a sharpness of the printed indicia's edge elements; and/or
a degree of overprint or underprint of the printed indicia.

10. The indicia reader of claim 7, wherein the microprocessor is configured for, in response to the triggering event, transmitting a timestamp, an image of an item bearing the indicia, a number of attempts to decode an indicia and/or a processing time taken to decode the indicia.

11. The indicia reader of claim 7, wherein the microprocessor is configured for, in response to the triggering event, transmitting the decoding result and the indicia readability rating via the communication interface to an external server.

12. A system comprising:
a server; and
an indicia reader comprising:
an image sensor for generating a first signal;
an imaging lens for focusing light on the image sensor;
a source for emitting light;

a photo-detector for receiving reflected light and generating a second signal corresponding to the intensity of the reflected light;

a communication interface for transmitting data; and a microprocessor communicatively coupled to the image sensor, the photo-detector, and the communication interface, the microprocessor being configured for:

in response to a triggering event, generating a decoding result;

in response to the triggering event, determining an indicia readability rating; and in response to the triggering event, transmitting the decoding result and the indicia readability rating via the communication interface to the server;

wherein the triggering event comprises a failure to decode indicia represented in the second signal which was successfully decoded as represented in the first signal.

13. The system of claim 12, wherein the triggering event comprises a failure to detect indicia, an indicia readability rating of less than a pre-defined threshold, an attempt to decode indicia that exceeds a pre-defined time period, a user interface action, and a command received via the communication interface.

14. The system of claim 12, wherein the indicia readability rating is determined based on:

a ratio of an average color intensity of printed areas and an average color intensity of background areas on a substrate bearing printed indicia;

a sharpness of the printed indicia's edge elements; and/or a degree of overprint or underprint of the printed indicia.

15. The system of claim 12, wherein the server is configured for:

diagnosing a tag printer failure responsive to establishing that a plurality of items bearing tags produced by the tag printer cause an error rate exceeding a first pre-defined threshold rate;

diagnosing an item-related issue responsive to establishing that a plurality of copies of a same SKU item cause an error rate exceeding a second pre-defined threshold rate; and/or diagnosing an indicia-reader-related issue responsive to establishing that decoding operations performed by the indicia reader has an error rate exceeding a third pre-defined threshold rate.

16. The system of claim 15, wherein the server is configured for diagnosing a tag printer failure by averaging a plurality of indicia readability ratings from two or more indicia readers of tags produced by a specific tag printer to obtain the first pre-defined threshold rate.

17. The system of claim 15, wherein the server is configured for diagnosing an item-related issue by averaging a plurality of indicia readability ratings from two or more indicia readers of tags attached to a specific SKU item to obtain the second pre-defined threshold rate.

18. The system of claim 15, wherein the server is configured for diagnosing an indicia-reader-related issue by averaging a plurality of indicia readability ratings from two or more indicia readers to obtain the third pre-defined threshold rate.

19. The system of claim 15, wherein the indicia reader's microprocessor is configured for, in response to the triggering event, transmitting a timestamp, an image of an item bearing the indicia, a number of attempts to decode an indicia and/or a processing time taken to decode the indicia.

20. The system of claim 15, wherein:

the indicia reader comprises a hand held housing;

the image sensor, the imaging lens, the communication interface, and the microprocessor are disposed within the hand held housing; and the communication interface comprises a wireless communication interface for transmitting data wireless to the server.

* * * * *